No. 673,262. Patented Apr. 30, 1901.
R. L. HINE.
TRIPOD HEAD.
(Application filed Jan. 14, 1901.)

(No Model.)

WITNESSES:
Wm S Bell
Robert J Pollitt

INVENTOR,
Reuben L. Hine,
BY
Gartner & Steward,
ATTORNEYS.

THE NORRIS PETERS CO., PHOTO-LITHO., WASHINGTON, D. C.

UNITED STATES PATENT OFFICE.

REUBEN L. HINE, OF PATERSON, NEW JERSEY.

TRIPOD-HEAD.

SPECIFICATION forming part of Letters Patent No. 673,262, dated April 30, 1901.

Application filed January 14, 1901. Serial No. 43,125. (No model.)

*To all whom it may concern:*

Be it known that I, REUBEN L. HINE, a citizen of the United States, residing in Paterson, in the county of Passaic and State of New Jersey, have invented certain new and useful Improvements in Tripod-Heads; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to tripods for cameras, surveying instruments, &c.; and it has reference particularly to the head portion of a tripod, the object being to so arrange the parts of said tripod-head that the camera may be set at various angles by an adjustment independent of that afforded by the legs of the tripod.

The invention consists in the improved adjustable tripod-head constructed substantially as will be hereinafter described and finally embodied in the claim.

My invention is fully illustrated in the accompanying drawings, wherein—

Figure 1:
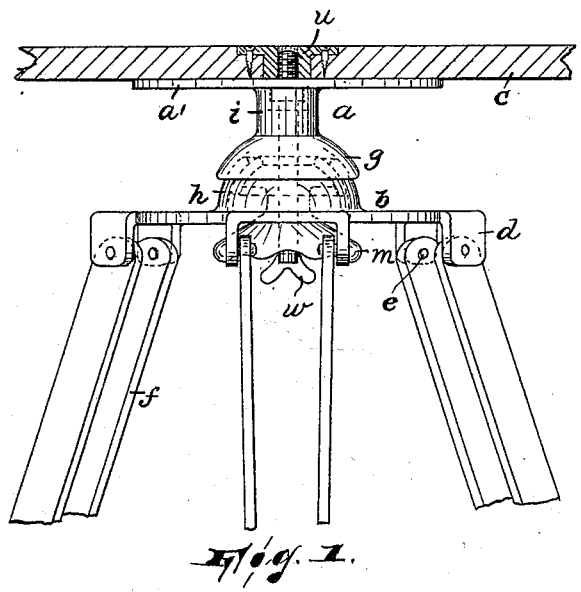
Figure 2:
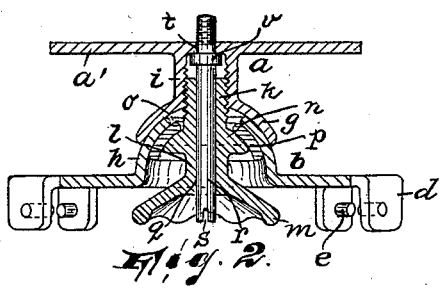

Figure 1 is a view in side elevation of the upper portion of a camera-tripod provided with my improved tripod-head and showing the bottom wall of a camera attached thereto, and Fig. 2 is a vertical section of the tripod-head.

In said drawings, $a$ and $b$ designate two members which are adjustably secured together in the manner hereinafter particularly set forth and upon the plate-like portion $a'$ of one of which, $a$, the bottom wall $c$ of the camera is adapted to seat and the other of which is provided with pairs of downwardly-extending parallel lugs $d$, having opposite pintles $e$, whereby the legs $f$ of the tripod are adapted to be pivotally attached to the tripod-head.

The members $a$ and $b$ are provided with substantially hemispherical or cup-shaped portions $g$ and $h$, which by presenting the one a convex surface and the other a concave surface are adapted to seat the one within the other, so as to permit a universal movement of the member $a$ on the member $b$. The cup portion $g$ is formed on the lower end of a tubular portion $i$, projecting downwardly from the member $a$. It is at the upper end of this tubular portion that the plate-like portion $a'$ is disposed.

The tubular portion $i$ is provided with interior screw-threading $j$, and into said tubular portion is adapted to be screwed the threaded upper end $k$ of a tightening-nut $l$, having an enlargement $m$, forming a handle portion. This tightening-nut is provided with an annular shoulder $n$, which when the tightening-nut is screwed into the tubular portion far enough acts to bind the cup portions together and so secure the members $a$ $b$ in any desired relative disposition. It should be remarked that the cup portion $h$ is provided with a central opening $o$, large enough to permit the tightening-nut, and consequently the member $a$, to assume an appreciable inclination.

$p$ is a cup-shaped washer which is by preference interposed between the shoulder $n$ and the cup portion $h$.

The tightening-nut is provided with a longitudinal bore $q$, through which bore extends a freely-movable spindle $r$. The lower end of this spindle protrudes from the tightening-nut and is provided with a cross-cut $s$, adapted to receive the point of a screw-driver to thereby manipulate it. The upper end of the spindle is threaded and extends through an orifice $t$ in the member $a$, which is alined with the bore $q$. The threaded portion of this spindle is adapted to be screwed into the usual internally-threaded bushing $u$, set into the wall $c$ of the camera, and in order that said spindle may tightly bind the camera in place it is provided with an annular shoulder $v$, disposed under the plate-like portion $a'$ of the member $a$ and adapted to take against its under side about the orifice $t$. Since the shoulder $v$ is inclosed in the tubular portion $i$, the tightening-nut being in place, the spindle is not normally detachable, and so is always in place ready for use.

The tubular portion $i$, since it projects far enough upwardly so that the plate $a$ and part $g$ have appreciable space between them, affords a readily accessible and convenient form of hand-grasp for use in manipulating the tightening-nut, which, it is to be observed, directly engages it, and is adapted to be turned with one hand while the tubular portion is held by the other.

It will be of course understood that the spindle may be provided with a wing piece or other form of handle $w$, if desired.

Having thus fully described my invention, what I claim as new, and desire to secure by Letters Patent, is—

In a tripod-head, the combination of two members disposed the one above the other and comprising the one a convex projection and the other a concave projection resting the one on the other, the upper one of said members also comprising an appreciably-elongated tubular portion affording a hand-grasp, and a plate, and said plate and the projection of said member being disposed respectively at the upper and lower ends of its tubular portion and appreciably spaced from each other, a tightening-nut penetrating said projections and having a threaded engagement with the tubular portion of said upper member and also having an annular enlargement adjacent the under face of the projection of the lower member, and a spindle penetrating said tightening-nut and the plate, said spindle having a shoulder adjacent, and adapted to impinge against, the under side of the plate and screw-threading adjacent the other side of the plate, and the camera being adapted to rest on said plate and be engaged by the threaded portion of the spindle, substantially as described.

In testimony that I claim the foregoing I have hereunto set my hand this 12th day of January, 1901.

REUBEN L. HINE.

Witnesses:
JOHN W. STEWARD,
ALFRED GARTNER.